(12) United States Patent
Willemin et al.

(10) Patent No.: US 11,686,631 B2
(45) Date of Patent: Jun. 27, 2023

(54) METHOD FOR CALIBRATING AT LEAST ONE ELECTRONIC TEMPERATURE SENSOR

(71) Applicant: The Swatch Group Research and Development Ltd, Marin (CH)

(72) Inventors: Michel Willemin, Prêles (CH); Jérôme Stauffer, Neuchâtel (CH); Thierry Scordilis, Cormondrèche (CH)

(73) Assignee: The Swatch Group Research and Development Ltd, Marin (CH)

( * ) Notice: Subject to any disclaimer, the term of this patent is extended or adjusted under 35 U.S.C. 154(b) by 319 days.

(21) Appl. No.: 17/193,514

(22) Filed: Mar. 5, 2021

(65) Prior Publication Data
US 2021/0341343 A1 Nov. 4, 2021

(30) Foreign Application Priority Data

Apr. 30, 2020 (EP) ..................................... 20172276

(51) Int. Cl.
*G01K 15/00* (2006.01)
(52) U.S. Cl.
CPC .................. *G01K 15/005* (2013.01)
(58) Field of Classification Search
CPC .............................. G01K 15/005; G01K 15/00
USPC .................... 374/1–3, 170, 141, 120; 702/99
See application file for complete search history.

(56) References Cited

U.S. PATENT DOCUMENTS

| 2013/0049454 A1* | 2/2013 | Le ........................... B60L 3/003 |
| | | 307/9.1 |
| 2017/0299623 A1* | 10/2017 | Suzuki ............... G01C 19/5776 |
| 2018/0180485 A1* | 6/2018 | Macmillan ................ G01J 5/10 |
| 2021/0223118 A1* | 7/2021 | Fujii .................... G01K 15/005 |

FOREIGN PATENT DOCUMENTS

| CN | 106201124 B | * 2/2019 | .......... G06F 3/0418 |
| EP | 0740421 A2 | * 10/1996 | |
| EP | 3 470 805 A1 | 4/2019 | |

(Continued)

OTHER PUBLICATIONS

European Search Report for EP 20 17 2276 dated Oct. 9, 2020.

*Primary Examiner* — Gail Kaplan Verbitsky
(74) *Attorney, Agent, or Firm* — Sughrue Mion, PLLC

(57) ABSTRACT

A method for calibrating an electronic temperature sensor connected to a mobile device. The device includes a microprocessor and memory linked to the microprocessor, to store an application coupled to a data entry interface. The temperature sensor is initially placed in a plurality of predetermined environments, where it provides an initial raw temperature value measured in each environment, and, for each of these environments, a predetermined initial temperature value corresponding to the actual temperature of this environment is entered beforehand directly into the application via the interface. The method includes in computing a calibration curve according to each predetermined initial temperature value entered from the application and according to each corresponding initial raw temperature value provided by the temperature sensor, storing in the device or in the sensor, calibration parameters determined from the calibration curve, and correcting by the calibration parameters each raw temperature value measured by the sensor.

6 Claims, 1 Drawing Sheet

(56) References Cited

FOREIGN PATENT DOCUMENTS

| | | | |
|---|---|---|---|
| JP | 2007057266 A * | 3/2007 | |
| JP | 2013-61232 A | 4/2013 | |
| JP | 2013-190236 A | 9/2013 | |
| JP | 6635391 B2 | 1/2020 | |
| WO | WO-2009047581 A1 * | 4/2009 | ....... G01R 19/16542 |
| WO | WO-2017122485 A1 * | 7/2017 | ........... A61B 5/1459 |
| WO | 2017/204733 A1 | 11/2017 | |
| WO | WO-2020127326 A1 * | 6/2020 | ............ B60T 13/662 |

* cited by examiner

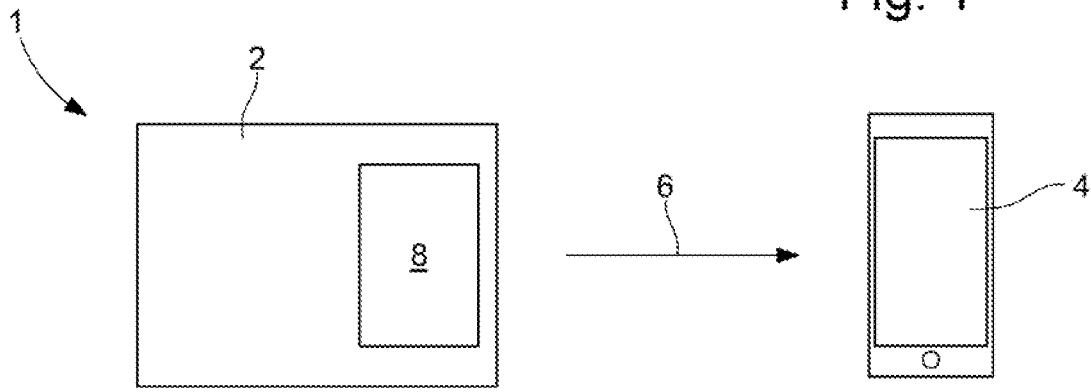
Fig. 1
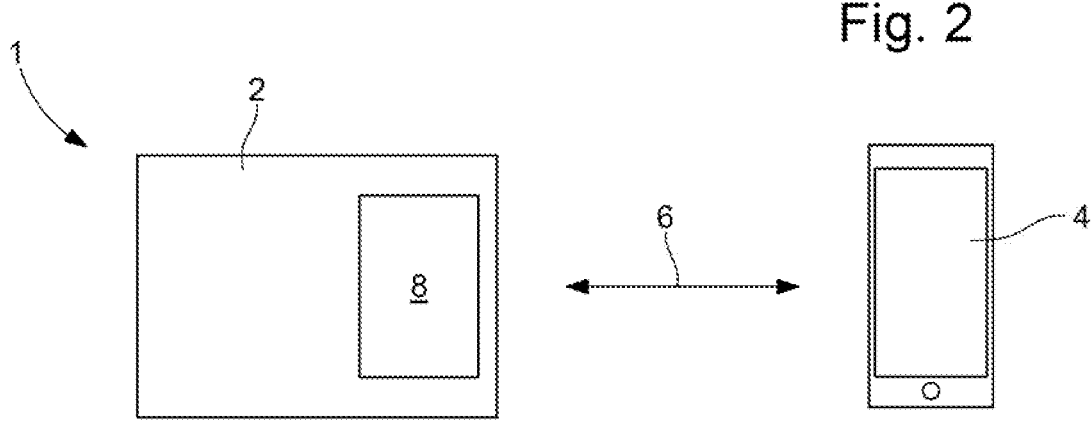
Fig. 2
Fig. 3
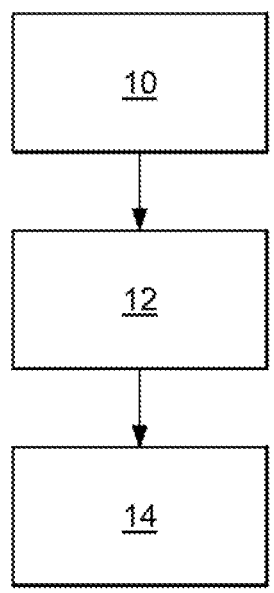

METHOD FOR CALIBRATING AT LEAST ONE ELECTRONIC TEMPERATURE SENSOR

CROSS-REFERENCE TO RELATED APPLICATION

This application claims priority to European Patent Application No. 20172276.6 filed Apr. 30, 2020, the entire contents of which are incorporated herein by reference.

TECHNICAL FIELD

The invention relates to a method for calibrating at least one electronic temperature sensor.

The invention also relates to an assembly configured to implement such a calibration method, the assembly comprising a mobile device in connection with at least one electronic temperature sensor.

TECHNOLOGICAL BACKGROUND

In the field of electronic temperature sensors, the sensors are generally calibrated in the factory. This operation, carried out automatically (for example via a thermal enclosure or a test bench) or by an operator, adds an additional step to the manufacturing of such sensors, which generates additional costs. In addition, the factory calibration is often unreliable, because there are different production environment conditions in relation to that of the end user. Therefore, disparities between a plurality of identical sensors, placed in the same calibration location, may appear.

In order to solve all or part of these disadvantages, there are known methods for calibrating electronic temperature sensors carried out outside of the factory, directly by the user of the sensor. Such a method is for example described in patent application EP 3 470 805 A1. This document describes a method for calibrating a temperature sensor for a wearable clinical thermometer whenever the temperature sensor must be replaced. The method comprises a base resistance acquisition step of sampling a base resistance value for a temperature sensor, that can be fitted detachably. The thermometer is mounted on a bracelet that the user may place during use on their wrist. A calibration coefficient relative to the temperature, necessary for calibrating the sensor, is computed in a computation component of the main unit of the clinical thermometer. The computation of the calibration coefficient is carried out based on a difference between the acquired base resistance value and a base resistance value measured beforehand via a standard temperature gauge. The calibration coefficient is stored in a storage medium of the measuring device, and is transmitted to the main unit of the clinical thermometer. A wireless data communication (for example via a Bluetooth communication protocol) is subsequently carried out from the wearable clinical thermometer towards a computer tablet or a smartphone, which makes it possible for a practitioner to read remotely (after calibration of the sensor by the patient) the temperatures measured on the body of this patient.

However, one disadvantage of such a calibration method is that in order to carry out the calibration, it is necessary to use a base resistance, as well as a temperature gauge. This operation is relatively complex and restrictive for the user of the sensor. Other known electronic temperature sensor calibration methods involve the use by the user of an external thermometer, which leads to the same disadvantage.

SUMMARY OF THE INVENTION

Therefore, the aim of the invention is to propose a method for calibrating at least one electronic temperature sensor, making it possible for a user to carry out himself the calibration of the sensor in a simplified and non-restrictive manner, directly in the target environment of the sensor.

To this end, the invention relates to a method for calibrating at least one electronic temperature sensor, which comprises the features mentioned in the independent claim 1.

Specific forms of the calibration method are defined in the dependent claims 2 to 5.

The calibration method according to the invention makes it possible for a user, in particular thanks to the use of a mobile device storing an application coupled to a data entry interface, to carry out himself the calibration of the temperature sensor in a simplified and non-restrictive manner. Indeed, the user may easily carry out the calibration of the temperature sensor directly in his mobile device, in collaboration with the sensor. Furthermore, such a calibration method according to the invention is particularly reliable, because the user carries out the calibration of the temperature sensor directly in the target environment of the latter. Finally, such a calibration method according to the invention makes it possible indirectly to significantly simplify the production or the temperature sensor(s) thus calibrated.

According to a first embodiment of the invention, the steps of computing the calibration and correction curve of each raw temperature value measured by the sensor are carried out by the mobile device, and the calibration parameters are stored in the mobile device during the storage step, the sensor transmitting to the mobile device, via a one-way data link, uncorrected raw temperature values. This first embodiment offers the advantage of reducing the size of the electronic components within the temperature sensor (the computation and correction steps being carried out by the mobile device), and therefore of reducing the manufacturing costs of the sensor.

According to a second embodiment of the invention, the steps of computing the calibration and correction curve of each raw temperature value measured by the sensor are carried out by the temperature sensor, and the calibration parameters are stored in the sensor during the storage step, the mobile device transmitting to the sensor, via a two-way data link, said at least one predetermined initial temperature value, the sensor transmitting to the mobile device, via the two-way data link, corrected temperature values. This second embodiment offers the advantage that the calibration is only carried out once by the user of the sensor, the sensor subsequently being correctly calibrated for all subsequent uses thereof. Furthermore, the temperature sensor provides already corrected temperature values.

According to a third embodiment of the invention, the step of computing the calibration curve is carried out by the mobile device, the step of correcting each raw temperature value measured by the sensor is carried out by the temperature sensor, and the calibration parameters are stored in the sensor during the storage step, the mobile device transmitting to the sensor, via a two-way data link, said calibration parameters, the sensor transmitting to the mobile device, via the two-way data link, corrected temperature values. This third embodiment offers the advantage that the calibration is only carried out once by the user of the sensor, the sensor subsequently being correctly calibrated for all subsequent uses thereof. Furthermore, the temperature sensor provides already corrected temperature values. Finally, in relation to the second embodiment described above, the method according to the third embodiment of the invention makes it possible to reduce the number of computations carried out by the sensor (the computation step being carried out by the mobile device).

To this end, the invention also relates to an assembly configured to implement the calibration method such as described above, and that comprises the features mentioned in independent claim 6.

BRIEF DESCRIPTION OF THE FIGURES

The aims, advantages and features of the method for calibrating at least one electronic temperature sensor according to the invention will become clear in the following description based on at least one non-limiting embodiment illustrated by the drawings wherein:

FIG. 1 is a schematic representation of an assembly configured to implement the calibration method according to the invention, in a first alternative embodiment;

FIG. 2 is a schematic representation similar to that of FIG. 1, in a second alternative embodiment; and FIG. 3 is a flow chart showing steps of a method for calibrating at least one electronic temperature sensor according to the invention.

DETAILED DESCRIPTION OF THE INVENTION

FIG. 1 shows an assembly 1 according to a first alternative embodiment. The assembly 1 is configured to implement a method for calibrating at least one electronic temperature sensor 2 according to the invention. Apart from the temperature sensor 2, the assembly 1 also comprises a mobile device 4 in connection with the temperature sensor 2. According to the specific alternative embodiment of FIG. 1, the data link 6 between the temperature sensor 2 and the mobile device 4 is a one-way link. The mobile device 4 is typically a mobile phone of smartphone type, a computer tablet or also a laptop, without this being limiting within the scope of the present invention.

The electronic temperature sensor 2 comprises, apart from means for measuring the temperature (not shown), means 8 for transmitting data over the link 6. The data transmission means 8 for example consist of a wireless communication transmitter coupled to an antenna.

The mobile device 4 comprises data processing means and memory means linked to the data processing means, these different means not being shown in FIG. 1 for reasons of clarity. The data processing means for example consist of one or more processors. The memory means store a dedicated application, which is coupled to a data entry interface.

The data link 6 is for example a wireless radio link. The data link 6 is typically a radio link in accordance with the Bluetooth communication standard, without this being limiting within the scope of the present invention. Alternatively, the data link 6 may be a link in accordance with any type of proprietary format.

It is subsequently assumed that the temperature sensor 2 is initially placed in a plurality of predetermined environments. Preferably, the temperature sensor 2 is initially placed in at least three distinct predetermined environments. For each of these predetermined environments, a user of the mobile device 4 enters a predetermined initial temperature value into the dedicated application of the mobile device 4, via the data entry interface. Preferably, at least three predetermined initial temperature values are thus entered beforehand directly into the dedicated application of the mobile device 4. For each predetermined environment, the predetermined initial temperature value corresponds to the actual temperature of this environment, and is determined beforehand by the user by any suitable means.

The method for calibrating at least one electronic temperature sensor 2 according to a first embodiment of the invention, implemented by the assembly of FIG. 1, will now be described with reference to FIG. 3. For each predetermined environment, the temperature sensor 2 transmits to the mobile device 4 an initial raw temperature value measured in this environment.

During an initial step 10, the mobile device 4 computes a calibration curve, based on each predetermined initial temperature value and each corresponding initial raw temperature value. More specifically, the data processing means of the mobile device 4 carry out the computation of this calibration curve, based on the predetermined initial temperature values and the raw temperature values stored in the memory means of the device 4. Obviously, this calibration curve depends on the sensor type, and the simplest is to take a negative temperature coefficient NTC resistance or a positive temperature coefficient PTC resistance. At the end of this initial step 10, the processing means of the mobile device 4 determine calibration parameters from the calibration curve.

During a following step 12, the mobile device 4 stores the calibration parameters determined from the calibration curve. More specifically, the calibration parameters are stored in the memory means of the mobile device 4.

During a final step 14, the assembly 1 is used in nominal operating conditions. The electronic temperature sensor 2 thus transmits to the mobile device 4, via the one-way data link 6, uncorrected raw temperature values. The mobile device 4 then corrects each raw temperature value measured by the sensor 2, by means of the calibration parameters determined beforehand.

FIG. 2 shows the assembly 1 according to a second alternative embodiment. In this second alternative embodiment, the elements described with the same numerical references as those of the first alternative embodiment are identical to the latter and therefore will not be described in detail again. Apart from the means for measuring the temperature and the means 8 for transmitting data over the link 6, the temperature sensor 2 also comprises data processing means and memory means linked to the data processing means. These various means are not shown in FIG. 2 for reasons of clarity. The data processing means for example consist of a microprocessor, which is the simplest computation component. The data link 6 between the temperature sensor 2 and the mobile device 4 is a two-way link.

The method for calibrating at least one electronic temperature sensor 2, implemented by the assembly of FIG. 2, will now be described according to a second embodiment of the invention. For each predetermined environment, the mobile device 4 transmits to the temperature sensor 2, via the two-way data link 6, the predetermined initial temperature value entered by the user into the dedicated application of the mobile device 4.

During an initial step 10, the temperature sensor 2 computes a calibration curve, based on each predetermined initial temperature value (transmitted by the mobile device 4) and each corresponding initial raw temperature value (the latter value being measured by the sensor 2). More specifically, the data processing means of the temperature sensor 2 carry out the computation of this calibration curve, based on the predetermined initial temperature values and the corresponding raw temperature values. At the end of this initial step 10, the processing means of the temperature sensor 2 determine calibration parameters from the calibration curve.

During a following step 12, the temperature sensor 2 stores the calibration parameters determined from the calibration curve. More specifically, the calibration parameters are stored in the memory means of the temperature sensor 2.

During a final step 14, the assembly 1 is used in nominal operating conditions. The electronic temperature sensor 2 then corrects each raw temperature value measured, by means of calibration parameters determined beforehand. At the end of this step 14, the temperature sensor 2 transmits to the mobile device 4, via the two-way data link 6, corrected temperature values.

The method for calibrating at least one electronic temperature sensor 2, implemented by the assembly of FIG. 2, will now be described according to a third embodiment of the invention. For each predetermined environment, the temperature sensor 2 transmits to the mobile device 4 an initial raw temperature value measured in this environment.

During an initial step 10, the mobile device 4 computes a calibration curve, based on each predetermined initial temperature value (entered beforehand by the user into the dedicated application of the mobile device 4) and each corresponding initial raw temperature value. More specifically, the data processing means of the mobile device 4 carry out the computation of this calibration curve, based on the predetermined initial temperature values and the raw temperature values stored in the memory means of the device 4. At the end of this initial step 10, the processing means of the mobile device 4 determine calibration parameters from the calibration curve. The mobile device 4 then transmits to the temperature sensor 2, via the two-way data link 6, the calibration parameters thus determined.

During a following step 12, the temperature sensor 2 stores the calibration parameters transmitted by the mobile device 4. More specifically, the calibration parameters are stored in the memory means of the temperature sensor 2.

During a final step 14, the assembly 1 is used in nominal operating conditions. The electronic temperature sensor 2 then corrects each raw temperature value measured, by means of the calibration parameters stored in the memory means thereof. At the end of this step 14, the temperature sensor 2 transmits to the mobile device 4, via the two-way data link 6, corrected temperature values.

Thus, it is appreciated that the calibration method according to the invention makes it possible for a user to carry out himself the calibration of the temperature sensor in a simplified, reliable and non-restrictive manner, and this directly in the target environment of the sensor.

Although the present invention has been described with reference to the calibration of a single temperature sensor 2, a person skilled in the art will understand that the calibration method according to the invention applies in the same way to the calibration of a plurality of temperature sensors 2 by a same user of the mobile terminal 4.

The invention claimed is:

1. A method for calibrating and using at least one electronic temperature sensor (2) in connection (6) with a mobile device (4), the mobile device (4) and at least said electronic temperature sensor (2) forming part of an assembly (1), the mobile device (4) comprising data processing means and memory means linked to the data processing means, said memory means storing an application coupled to a data entry interface, the temperature sensor (2) being initially placed in a plurality of predetermined environments by a user, and, for each of these environments, a predetermined initial temperature value corresponding to an actual temperature of this environment being entered beforehand by the user via the electronic temperature sensor (2) before calibration and directly into the dedicated application of the mobile device (4), via said interface, wherein the temperature sensor (2) provides, for each of the predetermined environments, an initial raw temperature value measured in said environment, the method comprising the steps of:

computing (10) a calibration curve, based on each predetermined initial temperature value entered into the application, and each corresponding initial raw temperature value provided by the temperature sensor (2), storing (12) in the mobile device (4) or in the temperature sensor (2), calibration parameters determined from the calibration curve, and correcting (14), by means of said calibration parameters, each initial raw temperature value measured by the sensor (2).

2. The method according to claim 1, wherein the steps of computing (10) the calibration and correction curve (14) of each initial raw temperature value measured by the sensor (2) are carried out by the mobile device (4), and wherein the calibration parameters are stored in the mobile device during the storage step (12), the sensor (2) transmitting to the mobile device (4), via a one-way data link (6), uncorrected raw temperature values.

3. The method according to claim 1, wherein the steps of computing (10) the calibration and correction curve (14) of each initial raw temperature value measured by the sensor (2) are carried out by the temperature sensor (2), and wherein the calibration parameters are stored in the sensor (2) during the storage step (12), the mobile device (4) transmitting to the sensor (2), via a two-way data link (6), said at least one predetermined initial temperature value, the sensor (2) transmitting to the mobile device (4), via the two-way data link (6), corrected temperature values.

4. The method according to claim 1, wherein the step of computing (10) the calibration curve is carried out by the mobile device (4), wherein the step of correcting (14) each initial raw temperature value measured by the sensor (2) is carried out by the temperature sensor (2), and wherein the calibration parameters are stored in the sensor (2) during the storage step (12), the mobile device (4) transmitting to the sensor (2), via a two-way data link (6), said calibration parameters, the sensor (2) transmitting to the mobile device (4), via the two-way data link (6), corrected temperature values.

5. The method according to claim 1, wherein the temperature sensor (2) is placed by the user initially in at least three distinct predetermined environments, at least three predetermined initial temperature values being entered beforehand by the user directly into the application of the mobile device (4), each predetermined initial temperature value corresponding to the actual temperature of one of said environments.

6. An assembly (1) comprising a mobile device (4) in connection (6) with at least one electronic temperature sensor (2), wherein said assembly (1) is configured to implement the calibration method according to claim 1.

* * * * *